INVENTORS
JEAN L. J. VELLAS
LORENZO CASANOVAS PUIG

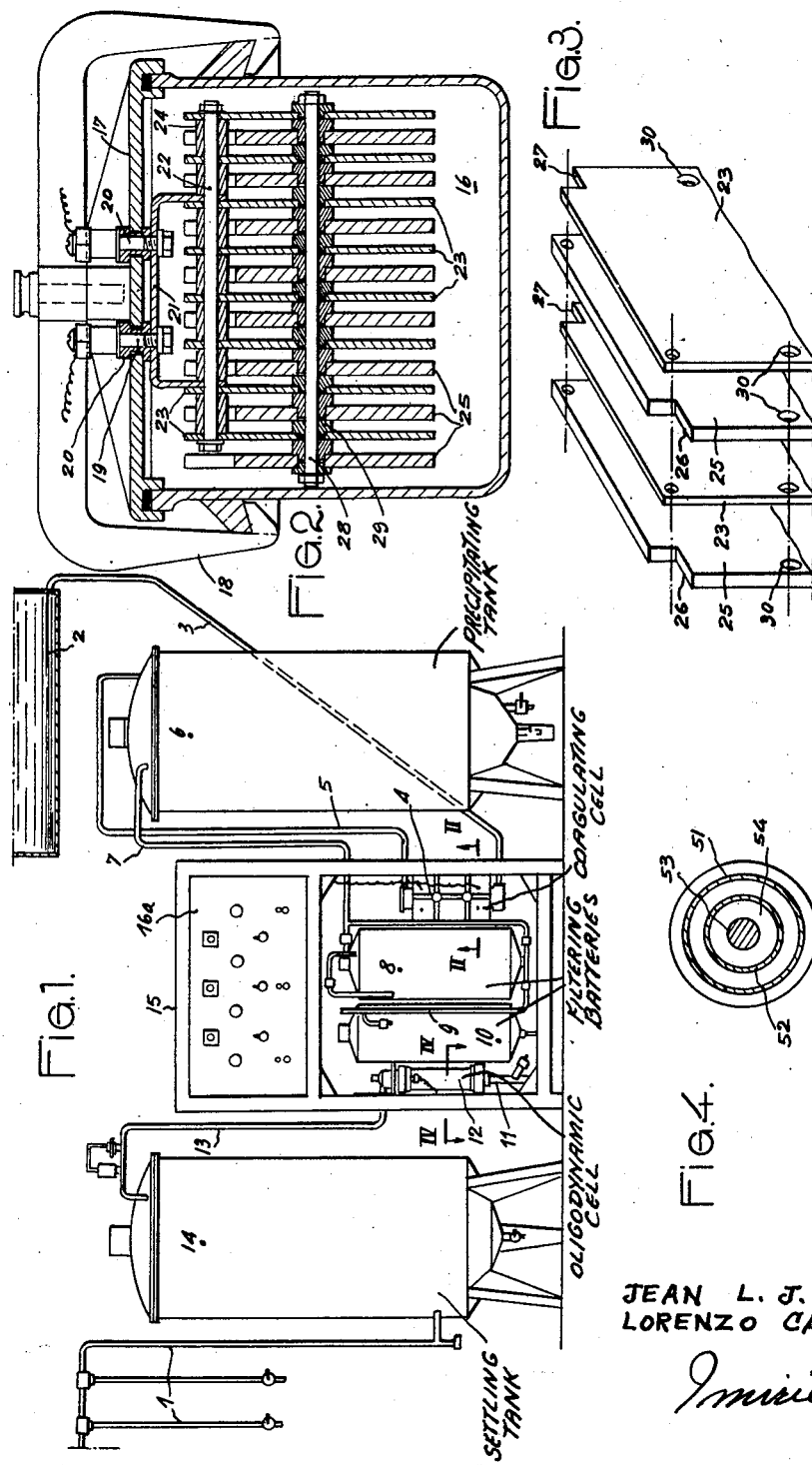

Attys.

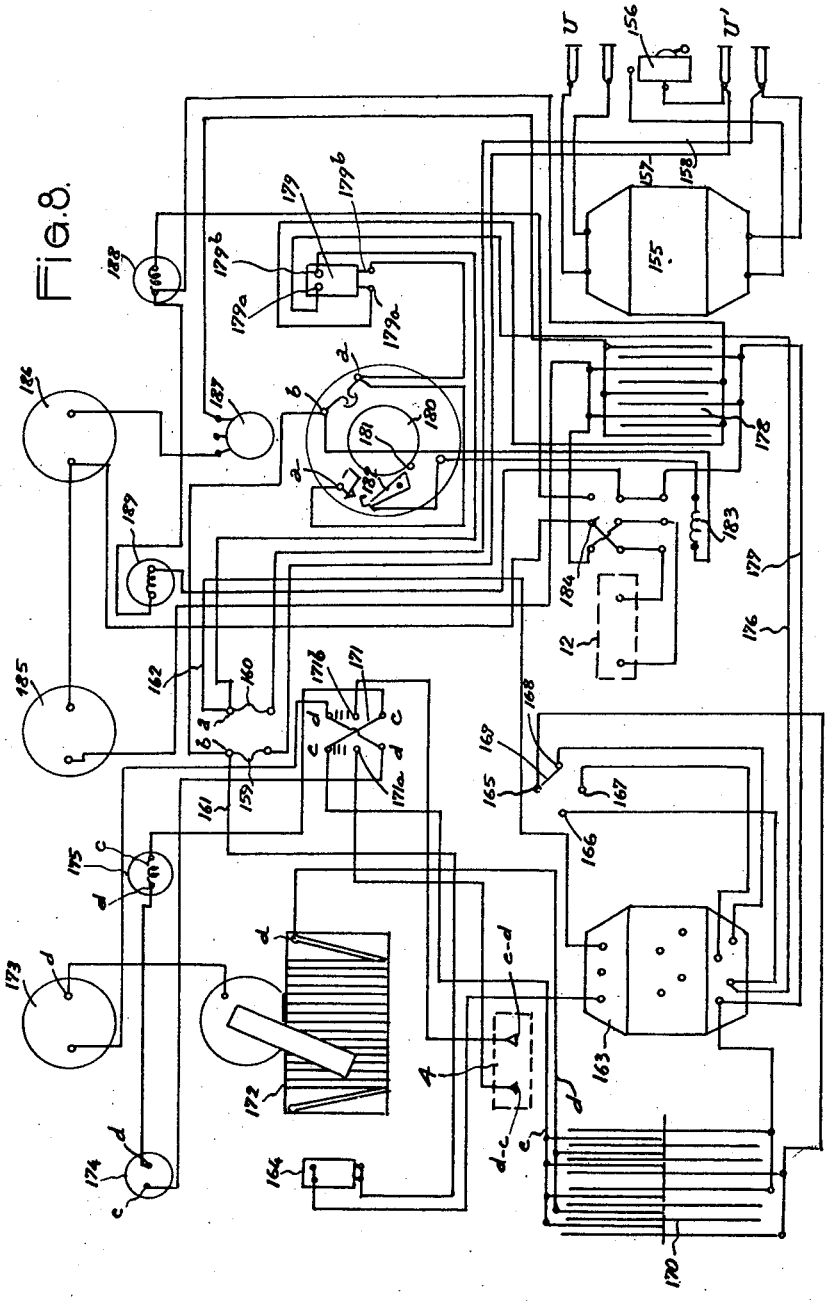

United States Patent Office 3,192,142
Patented June 29, 1965

3,192,142
PROCESS AND DEVICE FOR PREPARING DRINKING WATER FROM INSALUBRIOUS CRUDE WATER
Jean Léon Justin Vellas and Lorenzo Casanovas Puig, Toulouse, Haute-Garonne, France, assignors to Societe d'Etude et de Diffusion de Procedes et Brevets S.A., Geneva, Switzerland, a company of Switzerland
Filed June 14, 1960, Ser. No. 36,069
Claims priority, application France June 16, 1959, 797,647, Patent 1,230,728
5 Claims. (Cl. 204—149)

Chemical and bacteriological examinations of crude waters drunk without mistrust and previous analysis show that in numerous cases these waters contain a whole range of organic and inorganic impurities, as well as germs and bacilli which are extremely dangerous for the consumer.

The impurities that are the most frequently met with are made up of nitrites, ammonias, chlorides and an excess of organic matter, as well as various colonies, mildews, corynebacteriums, staphylocci, colibacilli, viscous bacteria, yeasts, saccharobacilli, etc.

Whereas the water distributed in the large towns of industrially developed countries is periodically subjected to exact analyses, this does not apply to the waters that are used for consumption in numerous countries, and in particular in countries that do not have sufficiently developed industrial means available.

Moreover, one is frequently led, in certain countries, in Africa, for example, to use, even for drinking purposes, waters that are highly polluted.

The present invention creates a process and a new device which enables even extremely polluted waters to be made drinkable and sterile. This extremely important result is obtained with equipment of small dimensions requiring little or no maintenance and consuming a very small quantity of electric power. Another advantage of the equipment lies in the fact that it can be easily transported, and actually, this equipment can even be permanently fixed on a lorry or trailer.

According to the invention, the process for the electrophysical purifying of waters intended to be drunk is characterized in that crude waters are subjected to the influence of a pulsating electric current set up between electrodes of different nature so as to cause an electrical unbalance of these waters while increasing their electric voltage so as to start up a flocculation process which is developed in a tank for decanting (i.e., precipitating) and separating the flocculate, the waters taken in this tank being filtered by a siliceous charge or other filtering material and by a charge of live charcoal before being themselves charged with insoluble silver ions effecting sterilization, then conveyed into a settling basin effecting the homogenization of the treatment, the waters being retained in this basin during a time sufficient for said silver ions to completely sterilize the water before it is distributed.

According to one embodiment of the equipment, for putting the process into operation, the device comprises a multiple electrode coagulation set in which the crude water is made to circulate parallel to said electrodes, this set emerging in a multiple compartment tank in which the flocculate is developed and isolated from the water, this tank having its exit in communication with a filtering set placed immediately in front of a silver electrode sterilizing set in which all the water to be treated is made to pass between said electrodes before being introduced into a closed settling tank whose capacity is such as to effect sterilization of the water by the silver ions produced by said silver electrode set, the coagulation and sterilization sets being both subject to an automatically operating electric control unit.

Various other characteristics of the invention will moreover be revealed by the detailed description which follows.

One embodiment of the invention is shown, by way of non-restrictive example, in the attached drawings.

FIG. 1 shows the assembly of the device of the invention.

FIG. 2 is a section, on a larger scale, taken substantially along the line II—II of FIG. 1.

FIG. 3 is a partial diagrammatical perspective showing an embodiment detail of certain of the members shown in FIG. 2.

FIG. 4 is a larger scale section taken substantially along the line IV—IV of FIG. 1.

FIG. 8 is an electrical diagram of an electrically operated control of the members of the device of FIG. 1.

In the method of execution shown in FIG. 1, the device is intended to supply drinking water to utilization pipes 1. The supplying of non-drinkable water to the device can be effected by any kind of means, for example from a filled tank 2, or by pipes under pressure or by a pump. The water conveyed to the device can have any kind of characteristics, its pollution condition in nowise modifying the quality of the treatment to which it is submitted.

Referring particularly to FIG. 1, the water from the filled tank 2 is conveyed by a pipe 3 to an appliance hereafter called a coagulation set 4 which is referred to later with reference to FIGS. 2 and 3. This appliance is intended to subject the water to special electrical treatment having the effect of starting up the coagulation process of harmful particles, animal, vetgetable or mineral, contained in the water. Circulation in the coagulation set 4 is effected in a continuous manner when the device is working.

Figure 5:
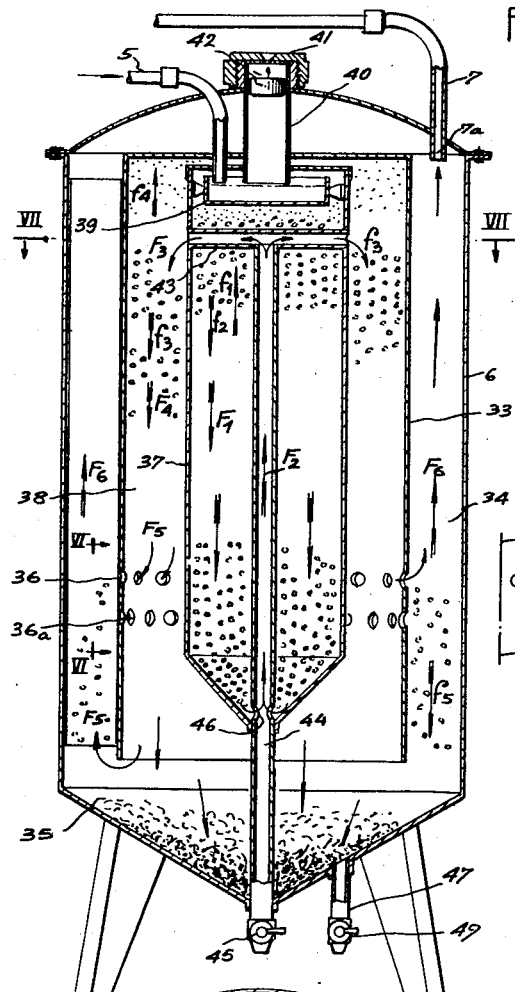
FIG. 5 is an axial section of one of the members of the device according to FIG. 1.

On leaving the set 4, the treated water is conveyed by a pipe 5 into a purifying and dectanting (i.e., precipitating) tank 6 which is shown in detail in FIG. 5.

On leaving the tank 6, the water is almost completely, freed from the impurities that it contained, and, moreover, living organisms that had been in suspension have mostly been killed and adsorbed by the floccuate and separated from the water mass which is then directed through a pipe 7 towards the entry of a filtering member 8 containing a charge of sand or other filtering medium intended to retain and isolate the fractions of floccuate formed by coagulated particles that have escaped from the tank 6. The water emerging from the filtering member 8 is directed by a pipe 9 into a deodorizing and final filtering cartridge 10, which cartridge advantageously contains a charge of live charcoal whose properties are well known.

The water coming from the cartridge 10 is perfectly purified and free from most of the germs. This water possesses thus all the characteristics required for being immediately consumed without danger.

So that this water is no longer contaminated, both in the piping in which it is made to circulate before being distributed, as well as in the receptacles into which it may be poured, it is directed from the cartridge 10 by a pipe 11 into a silver electrode sterilizing set 12 which is intended to charge this water with insoluble silver whose sterilizing property is well known.

Furthermore, and so that the silver charge is perfectly homogeneous, the water treated in the sterilizing set 12 is conveyed by a piping 13 into a tank 14 called a settling tank, this tank also acting as a storage reservoir.

It has been found advantageous that the capacity of the settling tank 14 should be at least equal to one-fourth of the hourly delivery for which the device is planned, so that the water brought into this tank remains there for at least a quarter of an hour, this time corresponding appreciably, as will be seen from what follows, to the lapse of time necessary for the complete carrying out of the treatment to which the water is subjected in the equipment, from the moment when it is introduced by piping 11 into the sterilizing set 12. This latter set conferring sterilizing properties on the water being electrically operated, the device comprises an automatic supply assembly for said sets and this supply assembly, which comprises means of regulating described in that which follows of this specification, more particularly with reference to FIG. 8, is entirely contained in a cabinet 15 which also holds the coagulation and sterilization sets, as well as the filtering element 8 and its supplementary cartridge 10.

In order to facilitate the understanding of the special treatment process to which the water is subjected in the device, a description is given hereafter of the various elements forming it, in the order in which they are found in this device.

To this end, FIGS. 2 and 3 show how the coagulation set 4 is advantageously constructed. This latter comprises a tank 16 which is fixed in the cabinet 15 at the place shown in FIG. 1. This tank is closed by a cover 17 retained by flanges 18 enabling its easy positioning and withdrawal. The cover 17 is provided with fixing rods 19 from which they are electrically insulated by washers 20. These fixing rods act as supports for two yokes 21 of which only one is shown. These yokes are made of an electricity conductive metal and their arms have holes for the passage of a spindle 22 used for tightening the electrodes 23 separated from each other by tubular cross-pieces 24 of conductive metal which are threaded on to the spindle 22. The second yoke, not shown in the drawing, is used in exactly the same manner, but supports electrodes 25 which are so arranged as to overlap between the electrodes 23.

In order to enable the positioning of the pins connecting the electrodes so as respectively to effect the electrical connection of the electrodes 23 and the electrodes 25, these electrodes, as shown in FIG. 3, respectively have notches 26 and 27. The notches 26, made in the electrodes 25, are formed in one corner, whereas the notches 27 of the electrodes 23 are formed in the other corner. In this manner, the cross-piece tubes 24 which connect the electrodes 23 pass into the notches 26 of the electrodes 25 without being in electrical contact with the latter and the cross-piece tubes that connect the electrodes 25 pass in the same manner into the notches 27 of the electrodes 23.

In order that the mechanical connection of all the electrodes is properly carried out, they are also connected by pins 28 on to which insulating cross-pieces 29 are threaded partially, inserted in the holes 30, which are made in the various electrodes so that they are in alignment.

As can be clearly seen from the foregoing, the assembly of electrodes and the members for supplying them with electric current, namely, the fixing rods 19, being supported by the cover 17, it is easy to position these electrodes and withdraw them for cleaning and eventually to change them when worn out, as it is only necessary to remove this cover after loosening the fixing flanges 18.

The electrodes 23 are preferably made of rustless steel plates, whereas the electrodes 25 are made of aluminium plates.

The distance between the various electrodes is determined in function of the current density that is required to be passed into the water and is, in any case, constant between adjoining electrodes.

By way of example and to illustrate the invention in a device like that of FIG. 1 which is intended to treat 200 liters of water per hour, it has been found advantageous to use eight rustless steel electrodes and eight aluminium electrodes, the surface of these electrodes being about 200 cm.$^2$ and their distance apart 5 millimetres.

As explained farther on, the coagulation set formed as stated nevertheless enables appreciably different forms of treatment to be carried out, more particularly by varying the amount of current used, as well as its voltage. Although, in the foregoing, it has been stated that the electrodes of the set shown were respectively made of rustless steel and aluminium, it is posisble, in certain cases, and for special treatments, to use electrodes of another kind.

FIG. 1 shows that the water for treatment is introduced into the coagulation set 4 at one end and comes out of the other. The flowing direction of the liquid current is thus selected so as to be directed parallel to the plane defined by the electrodes, which enables, seeing that the flow velocity between these electrodes is approximately uniform, to submit the water to a homogeneous treatment.

Figure 6:
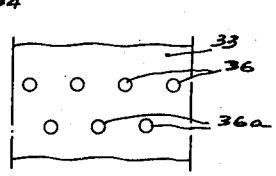
FIG. 6 is an opened elevation seen appreciably along the line VI—VI of FIG. 5.
Figure 7:
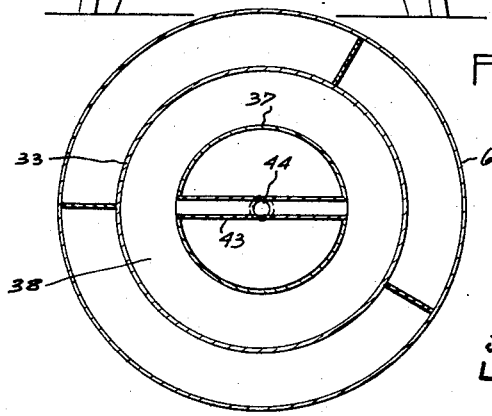
FIG. 7 is a section taken along the line VII—VII of FIG. 5.

After being passed, as explained above, into the coagulation set 4, the water is conveyed through the pipe 5 to the tank 6 in which the flocculation takes place of particles in suspension in the water, then a sedimentation of these particles. The tank 6, which is completely closed and consequently always full of water, contains a casing 33 which delimits an annular chamber 34 with the external wall of the tank 6. This annular chamber is in communication, by its lower part level with the cone 35, with the interior of the tank 6. The casing 33 has perforations 36, 36a, at a certain distance which is about equal to one third of its height, particularly visible in FIGS. 5 and 6. These perforations, whose unit section is small, are staggered with regard to one another, so that no perforation 36 is in line with the perforation 36a.

The volume delimited by the casing 33 contains a casing 37 of circular section whose external wall delimits a chamber 38, with said casing 3.

At its top part, the casing 37 is provided with an overflow bowl 39 into which the pipe 5 emerges coming from the coagulation set 4. A tube for evacuating air or gas 40 is also provided for communicating, by its base, with the interior of the casing 37, this tube traversing the top of the casing 33 and the cover of the tank 6 and being closed by a perforated plug 41 provided with a float 42. In addition to these various members, the casing 37 contains a traversal tube 43 below the overflow bowl 39, whose two ends emerge in the chamber 38. This tube is in communication with a second tube 44 which extends axially inside the casing 37 and projects outside of the tank 6. This tube supports a cock 45 and has perforations 46 made in the lower cone-shaped part of the casing 37 so as to effect a permanent communication between the tube and casing.

When the device works normally, the whole volume delimited by the tank 6 is completely filled with water. This water is conveyed by the pipe 5 into the bowl 39 which forms an anti-backwash deflector. The current which is set up in the tank 6 assembly thus takes place from the bowl 39 and this current is obviously slow because the total capacity of the tank 6 is selected so as to be at least equal to the hourly delivery of the device.

In leaving the bowl 39, the water is obliged to descend along the casing 37 in the direction of the arrow $F_1$. For fixing ideas, we consider the current velocity in the direction of the arrow $F_1$ to be equal to V. The water then passes through the perforations 46 of the tube 44 and rises in this tube in the direction of the arrow $F_2$. The section of this tube being small in relation to the section of the casing 37, the current velocity is thus speeded up but remains much less than the current velocity in the pipe 5 conveying water to the tank 6, for the section of the tube 44 is appreciably much greater than that of said pipe 5. The water is then conveyed by the transversal tube 43 in the direction of the arrow $F_3$ towards the chamber 38 delimited between the casing 37 and the casing 33. The volume of this chamber is greater than the volume of the casing 37, so that the current velocity set up in the chamber 38 in the direction of the arrow $F_4$ is slower than the velocity V stated above.

The chamber 38 communicates with the chamber 34 through the perforations 36 and 36a and by its base, the water is thus obliged to go through these perforations and the bottom of the chamber in the direction of the arrows $F_5$ which enable it to enter the annular chamber 34 delimited by the casing 33 and the internal wall of the tank 6. The volume of the annular chamber 34 is much greater than that of the casing 37 and that of the chamber 38, so that the current following the course of the arrow $F_6$ which is set up in the annular chamber 34 is of very slow velocity, for example, $V_1$, much less than the velocity V defined above.

The number of perforations 36 and 36a provided in the casing 33 is selected in allowing for the unit section of each of them, so that the water velocity in the perforations, when this water takes the direction of the arrows $F_5$, is appreciably equal to $V_2$ which corresponds to the velocity of the water in the chamber 38.

The evacuation of the water is then effected through the pipe 7 whose opening 7a is placed near to the high part of the tank 6. The section of the pipe 7 is larger than the section of the piping 5 so as to create two different velocities of entry and exit.

Owing to the special current supply, which is described farther on, to the electrodes of the coagulation set 4, these electrodes have the effect of transmitting positive charge ions, that is to say, with a sign contrary to the normal load of matters in suspension, so that within the liquid mass there is set up an unbalance which causes the mutual attraction of ions and particles. This attraction is moreover reinforced owing to the elevating of the electric voltage imparted to the water during its passage through the set.

Numerous experiments have shown that, in this manner, it was possible to eliminate nearly the whole of the harmful particles by coagulation. Actually, if we consider the non-mineral matter dissolved in water, we notice that, under the action of electric current, the nitrogenous materials dissolved go according to the reaction of the medium towards the positive or negative electrodes where they flocculate to a certain extent. An elimination, making the waters treated less putrescible under the action of ferments owing to a partial deficiency of nitrogen, operates by oxidation by utilizing the unused oxygen given off at the positive electrodes. The same phenomenon is observed with regard to colouring materials which become insoluble by oxidation.

With regard to the elimination of inorganic matter in suspension, and more particularly colloidal silica and also sometimes certain metals capable of remaining in balance in the form of salts, it has been noticed that, under the effect of the electric current, the silica in the form of silicic acid goes towards the negative electrodes where it flocculates as a positively charged matter, hence its elimination is thus easy. This deactivated silica plays the part of a purifier, in its turn. The negative charge colloidal clay sees its balance constant broken and flocculates in the presence of the positive ions given off by the electrodes of the set. One of the sets of electrodes of the set being made of aluminium, there is consequently a giving off of aluminium ions as well as hydrogen given off. The aluminium ions in contact with the oxygen instantaneously form alumina $Al_2O_3$. Now, while the electric current encounters a certain resistance due to the removal of the aluminium ions, the electrolytic release of oxygen remains constant so that the metallic release is less, and there is oxygen remaining that intervenes, as explained above, for oxidizing and making insoluble the non-mineral dissolved matters.

This oxygen also enables the iron contained in the water to be oxidized and made insoluble.

Furthermore, the manganese, which may be found in the water and which is undesirable, on account of its catalytic function as activator of the putrefaction process of organic matter, is thus eliminated, but by a process different to that leading to the elimination of the iron. It is actually in contact with the hydrogen released at the negative electrodes of the set that the manganese salts are reduced to insoluble manganese compounds.

Moreover, by suitably selecting the characteristics of the current supplied to the electrodes, it becomes possible, to a certain extent, appreciably to lower the rate of mineral matter in solution in the water, by simply modifying the chemical contexture of the salts, especially in the case of calcareous salts which are made insoluble.

As can be seen from the foregoing, the electric treatment effected by the coagulation set 4 has the effect of causing the starting of flocculation. This flocculation generally takes place in at least one hour after the passage of the liquid through the set and is one of the reasons why the tank 6 has a capacity at least equal to the hourly delivery of the device. The water which starts its flocculation process as soon as it passes between the electrodes of the coagulation set is directed by piping 5 above the bowl 39 of the tank 6 where it penetrates by overflowing inside the casing 37. The flocculate, arising out of the attraction of contrary sign particles, swells and tends at first to rise in the direction of the arrow $f_1$ for its density at the start is less than that of the water. In rising, the particles continue to bind together owing to their mutual attraction and progressively form flakes which hydrate and fall in the direction of the arrow $f_2$.

It results from this special process that the top part of the casing contains a large number of flakes of increasing size of which some are animated with a movement in the direction of the arrow $f_1$ and others in the direction of the arrow $f_2$.

It has been noticed that the sedimentation speed of the flakes is function of the size of the amalgamated particles. The falling graph is logarithmic and, consequently, the falling speed in the direction of the arrow $f_2$ of the flakes increases from single to double for an increase in volume of 33% of these flakes.

The descending current of flakes in the direction of the arrow $f_2$ encountering the rising current of these flakes, has the effect of very quickly increasing the volume of the mass of flakes and hence causing a scavenging of the rising flakes. This means that the bottom of the casing 37 contains a large number of large sized flakes which are carried along at the same time as the water current in the direction of the arrow $F_2$ in the tube 44. These flakes are thus conveyed into the chamber 38 at a certain distance from its upper part. The large flakes immediately begin to fall in the direction of the arrow $f_3$. In the chamber 38, it may happen that the flocculation started is not finished, and, consequently, certain particles still tend to rise in this chamber in the direction of the arrow $f_4$ where the same process as that described above is repeated. The flakes falling in the direction of the arrow $f_3$ continue to swell, and, consequently, their movement is progressively speeded up and sent in the same flowing direction as the water, seeing that the latter flows in the direction of the arrow $F_3$.

As explained above, the speed of the water in the chamber 38 is slow, and less than the velocity V in the casing 37. On the other hand, the falling speed of the flakes is appreciably greater in the chamber 38 than in the casing 37. In view of this result and of the fact that the speed of the water in the direction of the arrow $F_6$ in the annular chamber 34 is still slower, it follows that the flakes falling in the chamber 38 in the direction of the arrow $f_3$ are not normally carried along through the perforations 36 and 36a, and this, so much the less that the flakes, following a linear trajectory, can only pass in front of a single perforation, for the latter are staggered in relation to one another. Almost the whole of the flocculate thus formed is therefore decanted into the cone-shaped bottom 35 of the tank 6 and only a few particles are taken into the annular chamber 34. As the water only reaches that chamber at the end of its circuit, the agglomerated particles have no further tendency to rise, and, consequently, those of these particles which, in spite of everything, are carried into said annular chamber 34 are animated with a descending movement in the direction of the arrow $f_5$ so that these particles accumulate in the bottom of the cone 35 of the tank 6 in the shape of slimes.

As shown in the drawing, the slimes formed in the bottom of the tank 6 can be periodically evacuated through a discharge pipe 47, provided with a cock 49 which is actuated for causing this evacuation; the slimes in the chamber 37 are also evacuated by the cock 45, this latter cock eventually enabling the evacuation of part of the flakes concentrated at the bottom of the casing 37, which flakes might finally stop up the perforations 46, after the device has been in operation for a considerable time.

The water in the annular chamber 34 rises appreciably to the level of the top of the cylindrical part of the tank 6 and is already practically purified when it leaves the tank 6 from this level. The very few particles which might still remain in suspension and which are carried along by the pipe 7 are obviously retained in the filtering element 8 which contains advantageously a charge of sand or other filtering medium. Owing to the very considerable purification to which the water has already been submitted when entering the filtering element 8, the clogging of the latter only occurs after a very long working period, and consequently, in most cases, it is only necessary to wash the charge of sand or other filtering materials every nine or twelve months. The quality of the water is still further improved owing to the presence of the adjoining cartridge 10 (FIG. 1) which contains a charge of live charcoal, whose properties are well known in themselves so that they do not need to be repeated here in detail.

The water, on leaving the cartridge 10, is perfectly purified, filtered and free from practically all its initial germs. This has been shown more particularly by the numerous analyses that have been carried out. Some of these analyses are also given in the following part of the specification. The water distributed at the exit from the device requiring not only to be sterile, but also to possess bactericide qualities, is made to pass continuously, as explained above, through a sterilizing set 12. This set essentially comprises a casing with two silver electrodes 52, 53 inside, which delimit between them an annular channel 54 in which all the water coming from the charcoal cartridge 10 must necessarily pass before being conveyed to the settling tank 14. The electrodes 52, 53 are respectively connected up to two terminals of an electric generator which is described farther on with reference to FIG. 8. This generator is intended to supply a pulsating current set up, between the two said electrodes 52, 53, a slight electrolysis phenomenon having the effect of charging the water with insoluble silver bactericide ions.

The surface of the electrodes 52, 53 and the current supplied to them are selected, allowing for the circulation speed of the water in the annular channel 54, so that the quantities of silver supplied to the water are between 40 and 60 thousandths of a milligram of silver per litre, which is sufficient to secure the destruction of all pathogenic germs, such as mildews, corynebacteriums, staphylocci, colibacilli, viscous bacteria, yeasts, saccharobacilli and other ferments which might still be in the water already treated, either in the pipings or receptacles into which the treated water is subsequently conveyed.

The settling tank 14, which is provided behind the sterilizing set 12, is intended to enable the sterilizing function to be achieved possessed by the insoluble silver ions, by simultaneously effecting a perfect homogenization of their distribution, so that it is certain that the water distributed by the piping 1 is perfectly sterile and also capable of sterilizing the receptacles in which it may be subsequently used. In experiments carried out, it was noticed that water taken from the exit from the settling tank 14 and placed in hermetically sealed bottles indefinitely retained its sterile condition. In other experiments, the same water, kept in an open basin in communication with the atmosphere, retained its sterilizing property for 15 days.

As already explained at the beginning of this description, the purifying and sterilizing device of the invention is completely automatic, and, to this end, the cabinet 15 contains the controlling assembly shown in FIG. 8.

This assembly comprises an input self-transformer 155 enabling the device to be equally well connected to a 220-volt current source whose terminals are designated by the letter U, or to a 110-volt current source whose terminals are designated by the letter U'.

156 designates a switch used for putting in or cutting out the self-transformer 155 according to the U or U' voltage available for supplying the device. The current under normal voltage from the mains is led by the leads 157, 158 to fuzes 159, 160. The output terminals $a$, $b$ of these fuzes are used for supplying two distinct main circuits.

A lead 161 and a lead 162 act for supplying a voltage lowering transformer 163 whose putting into circuit is controlled by a hand-operated switch 164 mounted on the lead 161.

The secondary winding of the transformer 163 has multiple outputs and its various outputs are connected to terminals 165, 166, 167 and 168, the terminal 165 corresponding, for example, to one of the ends of the secondary of this transformer.

A slide-contact 169 enables the terminal 165 to be connected to any of the terminals 166, 167 and 168, and, consequently, to use a more or less large part of the secondary winding of the transformer 163 so that it is thus possible to obtain different voltages, for example 6, 12 and 24 volts. The output voltage of the transformer is applied to the input terminals of a rectifying cell 170, for example of the oxymetal type, which comprises two outputs, materialized by the leads $c$ and $d$ of different polarities, respectively negative and positive, which polarities are applied at different points of the electric circuit, as shown by the letters $c$ and $d$ where these latter are borne.

The polarities $c$ and $d$ are more particularly applied to four of the terminals of a reversing switch 171 whose free terminals 171a and 171b are connected to each of the two sets of electrodes of the coagulation set 4. The current coming from the rectifying cell 170 traverses a rheostat 172 and is measured in an ammeter 173 before being brought to the reverser 171 whose terminals are lettered $c$ and $d$ and are respectively connected up to two pilot lights 174, 175 enabling the position of the reverser to be ascertained.

As will be easily understood, for one of the positions of the reverser, one of the sets of electrodes of the coagulation set 4 is connected to the negative pole, namely, the pole c, whereas the other set is connected to the positive pole, namely, that designated by d. In changing the position of the reverser handle, the polarities applied to each of the two sets of electrodes of the coagulation set 4 are reversed, which enables the direction of the current in the latter to be reversed, so that the electrodes can be cleaned when they have reached a certain degree of polarization, which can be seen by the deviation of the ammeter 173 which tends to lower when the polarization of the electrodes increases.

Seeing that the current is rectified in a cell not comprising a phase change circuit, the current which is supplied to the electrodes corresponds only to one of the alternations of the alternating current coming from the transformer 163 and, consequently, this current is a pulsating current, which has been found preferable to any other kind of supply, for it has been noticed that the destruction of microbic fauna contained in the water is much more active when this fauna is subjected to current impulses rather than a direct current of appreciably uniform voltage. Actually, it has been noticed that the elements of microbic fauna are abruptly contracted or dilated with each current impulse, which entails their speedy death.

In addition to the supply described above of the coagulation set 4, the transformer 163 is also used for supplying the sterilization set 12. To this end, the leads 176, 177 are connected to the outputs of the transformer 163 supplying a second rectifying cell 178 whose putting under voltage is controlled by a switch 179 intended to close two distinct circuits, namely, that of the rectifying cell 178 when the studs 179a are united and that of an electric motor 180 when the studs 179b are united. The motor 180 is supplied as soon as the cell 178 is put under voltage and its supply is effected by the mains current coming from the output terminals a, b of the fuzes 159, 160. The polarity of these terminals a, b is shown by the same letters at the input of the motor.

The motor 180 acts for driving a reversing mechanism (not shown) actuating, by a finger 181, a switch 182 which is thus periodically opened and closed after a certain lapse of time that can be, for example, about ten minutes. This switch 182 is intended to energize, then cause to drop and again reenergize, and so on, a relay 183 electrically connected to the terminals a and b of the fuzes 159 and 160. This relay actuates a reverser 184 reversing the polarity of the current which is applied to two electrodes of the sterilization set 12.

The voltage and current intensity at the terminals of the electrodes of the sterilization set 12 are respectively metered by a voltmeter 185 and a milammeter 186 and are regulated by means of a rheostat 187. Moreover, the passage direction of the current is indicated by the pilot lights 188 and 189.

The various metering appliances, namely, the ammeter 173, the voltmeter 185 and the milammeter 186, as well as the regulating members formed by the rheostat 172, the rheostat 187, the switches 156, 164 and 179 are placed on an instrument panel arranged on the front 16a of the cabinet 15 and this instrument panel is also provided with various pilot lights 174, 175 and 188, 189, so that the running of the equipment can be easily ascertained at any moment, which renders its utilization extremely easy.

As can be clearly seen from the foregoing, the working of the purifying device is entirely automatic and only requires a very limited supervision, seeing that it is only necessary periodically to check the ammeter 173 for seeing that too great a polarization of the electrodes of the coagulation set is not occurring. When the limit of polarization is reached, it is only necessary to operate the reverser 171, the other adjustments remaining unchanged.

In order to ascertain the efficiency, the proper working of the device and its activity on various particles and fauna that might be contained in various waters, numerous purifying experiments were carried out with samples of particularly polluted waters.

In a first experiment, the waters used were taken from the outlet of a drain emerging into the "Midi Canal" in France. The chemical and bacteriological analyses of these waters before and after treatment were as follows:

*Example 1*

CHEMICAL ANALYSES

| | Canal water | |
|---|---|---|
| | Before treatment | After treatment |
| Nitrites | Presence | Nil. |
| Ammonia | Nil | Nil. |
| Hydrotimetric D°, total | 14° | 14°. |

BACTERIOLOGICAL ANALYSES

| | Canal water | |
|---|---|---|
| | Before treatment | After treatment |
| Corynebacterium | 100 per cm.$^3$ | Nil. |
| Staphylococci | 325 per cm.$^3$ | Nil. |

In this experiment, the coagulation set was supplied under six volts and its consumption was 12 ampere-hours per cubic metre of water treated, whereas the sterilization set showed at the terminals a potential difference equal to 0.8 volt and consumed 30 milli-amperes.

In a second experiment, waters taken from the same place were used, but before treatment they were submitted to a supplementary sowing with gelatine meat-broth. The results of the analysis were as follows:

*Example 2*

CHEMICAL ANALYSES

| | Canal water | |
|---|---|---|
| | Before treatment | After treatment |
| Nitrites | Traces | Nil. |
| Ammonia | Traces | Nil. |
| Permanent hydrot. D° | 18° | 11°. |

BACTERIOLOGICAL ANALYSES

| | Canal water | |
|---|---|---|
| | Before treatment | After treatment |
| Germs per cm.$^3$ | 4,800 | Nil. |
| Various colonies | Presence | Nil. |
| Mildews | Presence | Nil. |
| Staphylococci | Presence | Nil. |

In this experiment, the coagulation set was supplied under a current of 15 ampere-hours per cubic metre of water treated, the sterilization set being regulated for charging the waters at 60 thousandths of a milligram of silver per litre.

In a third experiment, waters were used heavily charged with chloride and also possessing a very high hydrotimetric degree. The adjustment of the coagulation set was, for this purpose, considerably altered so that the treatment would specially act for eliminating the chlorides and considerably lowering the hydrotimetric degree. The adjustments used were the following:

Supply voltage of the coagulation
  set _____ 12 volts.
Amperage supplied _____ 40 ampere - hours per cubic metre.

The results obtained were as follows:

*Example 3*

CHEMICAL ANALYSES

|  | Canal water | |
| --- | --- | --- |
|  | Before treatment | After treatment |
| Nitrites | Presence | Nil. |
| Ammonia | Traces | Traces. |
| Permanent hydrot. D° | 100° | 8°. |

BACTERIOLOGICAL ANALYSES

|  | Canal water | |
| --- | --- | --- |
|  | Before treatment | After treatment |
| Germs per cm³ | 1,035 | 9. |
| Mildews | Presence | Nil. |
| Staphylococci | Presence | Nil. |

As can be seen from the above-mentioned examples, in all cases the quality of the water obtained was that of a sound drinking water in spite of the considerable pollution of the waters used to be put into the device.

The invention is not restricted to the form of embodiment shown and described in detail, for various modifications can be applied to it without going outside of its scope.

We claim:

1. The method of purifying crude water in a circulating system to produce water suitable for drinking, comprising the successive steps of
    passing the circulating crude water in contact with electrode means supplied with a pulsating low-voltage direct current to initiate coagulation of the impurities contained therein;
    continuously circulating the electrically-treated water in a closed precipitating tank full of water and having a capacity at least equal to the hourly delivery rate of the crude water to effect flocculation and separation of the impurities contained in the water;
    filtering the water;
    charging the filtered water with a small amount of silver ions by means of a low voltage pulsating current acting on at least one silver anode; and
    introducing the ionized water into a settling tank having a capacity at least equal to one fourth of the hourly delivery rate of the crude water and causing the water to remain in the tank for a period sufficent to effect complete sterilization by said silver ions.

2. Apparatus for purifying continuously circulating crude water to produce water suitable for drinking, comprising
    means for treating the crude water to initiate coagulation of the impurities contained therein, comprising a container having an inlet and an outlet, a plurality of parallel flat electrodes arranged in said container parallel with the direction of fluid flow between said inlet and outlet, and means supplying a low-voltage pulsating direct current to said electrodes;
    closed static precipitating tank means for flocculating and separating the impurities from said electrically treated water and including an inlet connected with said electric treating means, and an outlet, said precipitating tank means being filled with water and including a plurality of chambers having increasing volumes, respectively, whereby the water is successively circulated at speeds progressively decreasing and less than the precipitation rate of the flocculate, to separate the flocculate from the water;
    filter means connected with the outlet of said precipitating tank means for filtering the water emitted therefrom;
    ion generating means connected with said filter means for sterilizing the filtered water, comprising at least one silver anode, and means supplying a low-voltage pulsating current to said silver anode for charging the water with a small quantity of non-soluble silver ions; and
    settling tank means receiving the water from said sterilizing means, said settling tank means having a capacity that is at least one fourth of the volume of said precipitating means to cause the water to remain in said settling tank means for a sufficient period to permit sterilization by the silver ions.

3. Apparatus as defined in claim 2 wherein said means for supplying low-voltage pulsating direct current to said electrodes comprises a single transformer means, a pair of rectifying cell means connected with the electrodes of said coagulating means and said sterilizing means, respectively, and control circuit means connecting said transformer means with said cell means, respectively, said control circuit means including regulating members interposed between each of said rectifying cell means and said coagulating and sterilizing means, respectively, for reversing the direction of the current supplied by said cell means after the electrodes reach a given state of polarization.

4. An installation as set forth in claim 2 wherein said precipitating tank means comprises a cylindrical outer wall having a conical bottom extending downwardly, and a closing cap provided with inlet and outlet ducts, said outer wall enclosing an annular partition provided with an open bottom and lateral openings and a closed top, said annular partition enclosing a tubular member the top and bottom of which are closed, said tubular member delimiting a chamber into which said inlet duct of the closing cap enters, a deflecting cupola located at the upper portion of said chamber to regulate the flow of water issued from said inlet duct, a pipe vertically extending inside said chamber and provided at its lower part with openings communicating with said chamber, and a transversally extending tube connected with the upper part of said pipe for communication between said pipe and the inside of said annular partition whereby water coming from said inlet duct flows inside said chamber where flocculation begins, passes through said openings of the pipe then through said pipe and tube to the inside of said partition allowing the flocculate to descend to said conical bottom of the outer wall whilst the water passes through said lateral openings of the annular partition to the outlet duct opening at the upper portion of the tank.

5. An installation as set forth in claim 4, in which said lateral openings of the annular partition have very small areas and are formed in two staggered rows whereby during precipitation a given portion of the flocculate can only pass in front of a single opening, the total surface area of said openings being such that the speed at which the water flows through each opening is less than the sedimentation speed of the flocculate when it falls to the conical bottom of the outer wall.

(References on following page)

References Cited by the Examiner

UNITED STATES PATENTS

| | | | |
|---|---|---|---|
| 937,210 | 10/09 | Harris | 204—149 |
| 961,924 | 6/10 | Wohlwill | 204—149 |
| 2,036,949 | 4/36 | Meinzer | 204—137.5 |
| 2,046,467 | 7/36 | Krause | 204—149 |
| 2,413,375 | 12/46 | Pomeroy | 204—152 |
| 2,640,026 | 5/53 | Wittington | 204—149 |
| 2,658,033 | 11/53 | Ferris | 204—152 |

FOREIGN PATENTS 384,466   1/32   Great Britain.

WINSTON A. DOUGLAS, *Primary Examiner.*

JOSEPH REBOLD, MURRAY TILLMAN, *Examiners.*